US006505507B1

(12) United States Patent
Imao et al.

(10) Patent No.: US 6,505,507 B1
(45) Date of Patent: Jan. 14, 2003

(54) TIRE AIR PRESSURE MONITORING APPARATUS AND EXTERNAL COMMUNICATION APPARATUS

(75) Inventors: Noboru Imao, Ogaki (JP); Mitiya Katou, Ogaki (JP); Setsuhiro Saheki, Ogaki (JP)

(73) Assignee: Pacific Industrial Co., Ltd., Gifu-ken (JP)

( * ) Notice: Subject to any disclaimer, the term of this patent is extended or adjusted under 35 U.S.C. 154(b) by 0 days.

(21) Appl. No.: 09/495,218

(22) Filed: Jan. 31, 2000

(30) Foreign Application Priority Data

Oct. 13, 1999 (JP) .......................................... 11-290647

(51) Int. Cl.[7] ............................................. B60C 23/02
(52) U.S. Cl. .................................................... 73/146.5
(58) Field of Search ............................ 73/146.5, 146.2, 73/146.3, 146.8, 146, 146.4; 340/447, 438, 442, 445, 466, 448

(56) References Cited

U.S. PATENT DOCUMENTS 5,109,213 A * 4/1992 Williams .................... 340/447
5,540,092 A * 7/1996 Handfield et al. ......... 73/146.5
5,573,611 A 11/1996 Koch et al.
5,602,524 A * 2/1997 Mock et al. ................ 340/447
5,612,671 A * 3/1997 Mendez et al. ............. 340/447
5,924,055 A * 7/1999 Hattori ....................... 702/138
6,034,597 A * 3/2000 Normann et al. ........... 340/447
6,036,179 A * 3/2000 Rensel .................... 267/64.11
6,112,587 A * 9/2000 Oldenetted ................ 73/146.5

* cited by examiner

*Primary Examiner*—William Oen
(74) *Attorney, Agent, or Firm*—Crompton, Seager & Tufte, LLC

(57) ABSTRACT

A tire air pressure monitoring apparatus includes a plurality of transmitters provided in respective tires on a vehicle and a receiver mounted on the body frame of the vehicle. Each transmitter radio-transmits data regarding the internal air pressure of the associated tire. The receiver receives radio-transmitted data from each transmitter. The receiver displays the received data on a display and stores the data in a non-volatile memory. When a request signal from a predetermined external communication apparatus is received, the receiver radio-transmits data stored in the non-volatile memory to the external communication apparatus. This allows various kinds of data such as air pressure data to be easily loaded from the receiver to the external communication apparatus.

10 Claims, 2 Drawing Sheets

TIRE AIR PRESSURE MONITORING APPARATUS AND EXTERNAL COMMUNICATION APPARATUS

BACKGROUND OF THE INVENTION

The present invention relates generally to a tire air pressure monitoring apparatus, which is mounted on a vehicle. More particularly, this invention relates to the acquisition of various kinds of data, such as air pressure data, stored in a tire air pressure monitoring apparatus. This invention also relates to an external communication apparatus, which communicates with a tire air pressure monitoring apparatus.

Wireless tire air pressure monitoring apparatuses for allowing a driver in the passenger compartment of a vehicle to check the air pressures of tires on the vehicle are known. A typical monitoring apparatus includes transmitters installed inside the respective tires and a receiver mounted on the body frame of the vehicle. Each transmitter measures the air pressure of the associated tire and radio-transmits data including the measured pressure value. The receiver receives data transmitted from the transmitters and displays information about the air pressure of each tire on a display located in the operator's compartment.

The receiver stores various kinds of data such as air pressure data, received from the transmitters, as history data. The receiver has a connector to connect the receiver to an external information processing apparatus, like a personal computer, via a cable. With the cable plugged into the connector, the history data stored in the receiver is sent to the information processing apparatus.

The history data loaded into the information processing apparatus can be used for maintenance and management of the vehicle. Even when the display warns of an abnormality in the air pressure of a tire while the vehicle is moving the operator may miss the warning display and thus may not notice the abnormality. However, if the warning is missed, the abnormality in the tire's air pressure can be discovered through the information processing apparatus if the history data stored in the receiver is sent to the information processing apparatus. With commercial vehicles such as taxis, trucks or buses, in particular, it is possible to collectively manage the history data of a fleet of vehicles at a single location. This capability facilitates the maintenance of multiple vehicles.

To send the history data stored in the receiver to the information processing apparatus, the cable from the information processing apparatus must be connected to the connector of the receiver. Since the receiver is located in the passenger compartment of the vehicle, a worker must bring the cable into the passenger compartment in order to connect the cable to the connector. Connecting the cable to the connector is therefore troublesome and takes time. When collectively managing the history data of a fleet of vehicles, connecting the cables to the may connectors is very difficult.

To collectively manage fleet data, it is essential to be able to identify the vehicle to which the history data that has been loaded into the information processing apparatus corresponds. However, the history data that is sent to the information processing apparatus from the receiver does not include information indicating the receiver that is the source of the history data. In other words, the history data does not include information identifying the vehicle from which it came. When the history data is sent to the information processing apparatus from the receiver, therefore, a worker must manually enters information indicating the receiver (or vehicle) that supplied the history data. Such information entry is very troublesome and is likely to result in errors. It is thus difficult to easily and reliably carry out collective management of fleet data.

SUMMARY OF THE INVENTION

Accordingly, it is an object of the present invention to provide a tire air pressure monitoring apparatus capable of easily sending out various kinds of data such as air pressure data.

It is another object of this invention to provide an external communication apparatus suitable for radio communication with such a tire air pressure monitoring apparatus.

It is a further object of this invention to provide an external communication apparatus that can easily and reliably associate a tire air pressure monitoring apparatus with a corresponding set of data.

To achieve the above objects, the present invention provides a tire air pressure monitoring apparatus mounted on a vehicle for monitoring the air pressure of a tire on the vehicle. The monitoring apparatus comprises a pressure sensor for measuring the air pressure of the tire, a memory for storing data regarding the measured air pressure, a notification unit for notifying an operator of an abnormality in the measured air pressure, and a transmission device for wirelessly transmitting data stored in the memory.

The present invention further provides an external communication apparatus for communicating with a tire air pressure monitoring apparatus mounted on a vehicle. The external communication apparatus comprises a transmission device, a reception device and a memory. The transmission device wirelessly transmits a signal requesting transmission of data, regarding the air pressure of a tire, to the tire air pressure monitoring apparatus. The reception device receives data wirelessly transmitted from the tire air pressure monitoring apparatus. The memory stores the received data.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A tire air pressure monitoring apparatus according to a first embodiment of the present invention will now be described referring to FIGS. 1 through 4.

Figure 1:
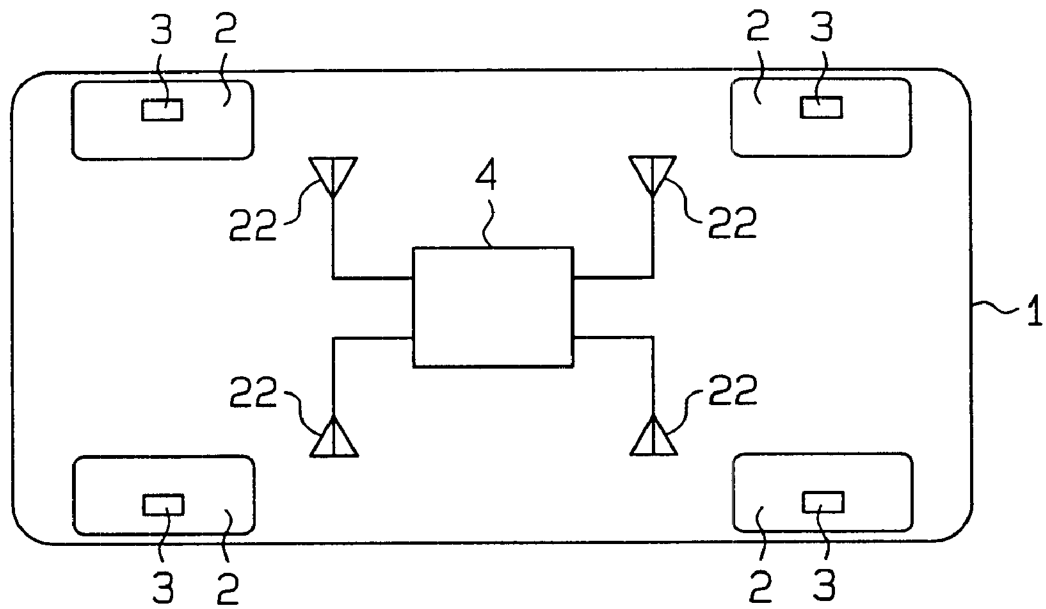
FIG. 1 is a schematic structural diagram illustrating tire air pressure monitoring apparatus according to one embodiment of this invention.

As shown in FIG. 1, the tire air pressure monitoring apparatus includes four transmitters 3, each located in one of four tires 2 of a vehicle 1, and a receiver 4 mounted on the body frame of the vehicle 1. Each transmitter 3 is secured to the wheel of the associated tire 2 so that the transmitter 3 is located inside the associated tire 2. The receiver 4 has four reception antennae 22 for the respective four transmitters 3.

Each transmitter 3 measures the internal air pressure of the associated tire 2 and radio-transmits data including the measured pressure data to the receiver 4. The receiver 4 receives the data radio-transmitted from each transmitter 3 through the associated antenna 22.

Figure 2:
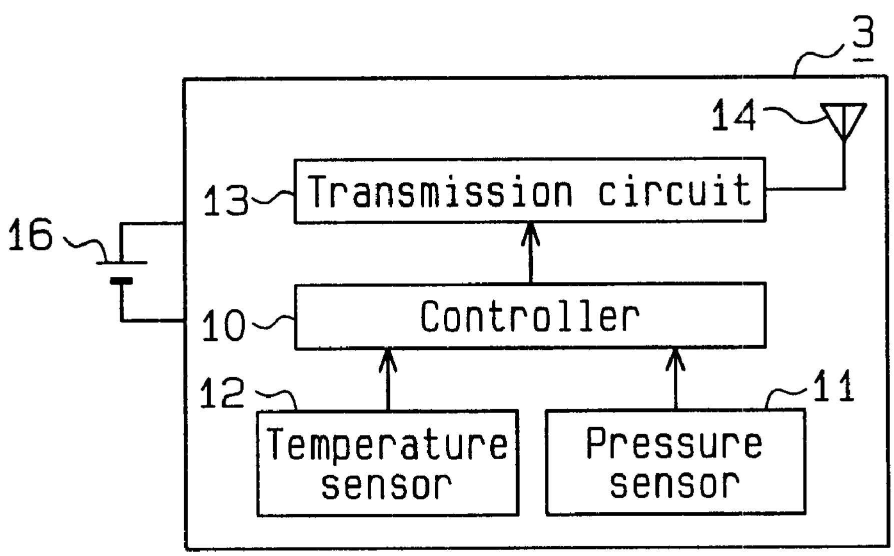
FIG. 2 is a block circuit diagram showing a transmitter in the monitoring apparatus in FIG. 1.

As shown in FIG. 2, each transmitter 3 includes a controller 10 which includes a microcomputer or the like. The controller 10 includes, for example, a central processing unit (CPU), a random access memory (RAM) and a read only memory (ROM). Unique identification codes (tire ID codes) are registered in advance in the internal memory, e.g., ROM, of each controller 10. The tire ID codes are used to identify the respective transmitters 3 mounted on the vehicle 1. Each transmitter 3 has a battery 16 as a power source.

The transmitters 3 are identical, so the following discussion relates to just one transmitter for simplicity. A pressure sensor 11 measures the internal air pressure of the associated tire 2 and sends the measured pressure data to the controller 10. A temperature sensor 12 measures the internal temperature of the associated tire 2 and sends the measured temperature data to the controller 10.

The controller 10 sends the pressure data, the temperature data and the tire ID code registered in the internal memory to a transmission circuit 13. The transmission circuit 13 encodes and modulates the data sent from the controller 10 and then radio-transmits the data via a transmission antenna 14.

The controller 10 commands the pressure sensor 11 and the temperature sensor 12 to take measurements at predetermined time intervals. The controller 10 also causes the transmission circuit 13 to regularly execute transmission when the pressure sensor 11 has taken measurements a predetermined number of times. If the measuring interval for the pressure sensor 11 is fifteen seconds and the predetermined number of measurements is forty, the controller 10 causes the transmission circuit 13 to perform transmission every ten minutes. When an abrupt change in the internal air pressure of the associated tire 2 is detected based on the pressure data from the pressure sensor 11, however, the controller 10 commands the transmission circuit 13 to transmit data, irrespective of the regular transmission at interval.

Figure 3:
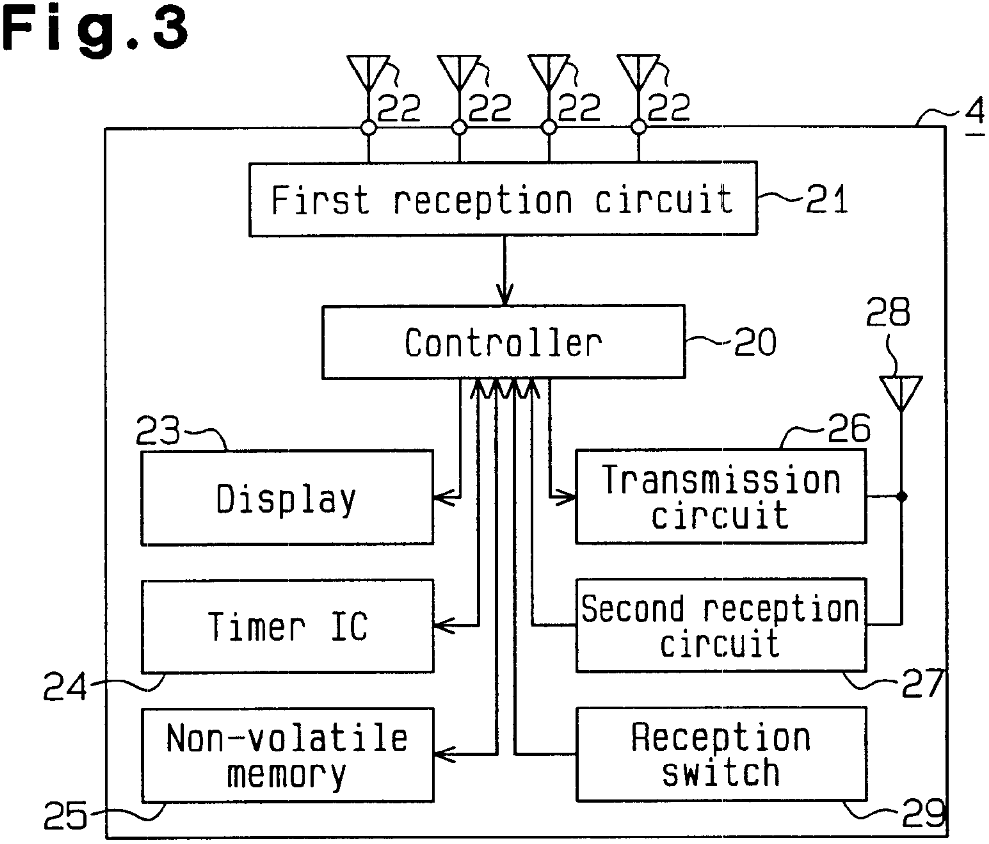
FIG. 3 is a block circuit diagram showing a receiver n the monitoring apparatus in FIG. 1.

As shown in FIG. 3, the receiver 4 includes a controller 20 that includes a microcomputer or the like. The controller 20 includes a CPU, an RAM and an ROM, for example.

The receiver 4 operates on, for example, the power from the battery (not shown) of the vehicle 1. The receiver 4 has a non-volatile memory 25 so that data can be retained even if the power supply is disrupted. The tire ID codes of the transmitters 3 are initially registered in this non-volatile memory 25.

Though not illustrated, the receiver 4 has an initialization switch that is manipulated at the time of initial registration of the tire ID codes. When a person in the vehicle 1 operates this initialization switch, the tire ID codes included in the transmission data from the individual transmitters 3 are initially registered in the non-volatile memory 25. This initial registration is generally executed when the tires 2 are installed on the vehicle 1 for the first time.

The receiver 4 has a timer circuit or a clock IC 24, which shows the date. At the time the aforementioned initial registration is carried out, the date indicated by the clock IC 24 is stored in the non-volatile memory 25 in association with the tire ID codes. That is, the non-volatile memory 25 stores the tire ID codes and the initial-registration date of those tire ID codes.

A first reception circuit 21, or first reception device, receives data transmitted from each transmitter 3 through the associated reception antenna 22 and sends the data to the controller 20 after demodulating and decoding the data. Based on the received data, the controller 20 detects the internal air pressure and temperature of the tire 2 corresponding to the transmitter 3 that sent the data.

The controller 20 stores the received data in the RAM and the non-volatile memory 25. Those memories store the received data in association with the respective registered tire ID codes. The non-volatile memory 25 stores the received data from each transmitter 3 as history data. The date that is specified by the clock IC 24 may of course be stored in association with the received data.

Further, the controller 20 displays information regarding the tire pressure and other desired information on a display 23, or notification unit. When the air pressure of any tire is abnormal, the operator is warned by the display 23. The display 23 is located within the field of view of the operator.

A transmission circuit 26 and a second reception circuit 27 are provided for radio communication with the external communication apparatus 5 in FIG. 4 which will be discussed later. The second reception circuit 27, or second reception device, receives a transmission request signal that is radio-transmitted from the external communication apparatus 5 via an antenna 28. The transmission circuit 26 radio-transmits data stored in the non-volatile memory 25 to the external communication apparatus 5 via the antenna 28 in accordance with the transmission request from the external communication apparatus 5.

The data that is to be radio-transmitted to the external communication apparatus 5 includes four sets of data associated with the four transmitters 3, respectively. The set of data associated with each transmitter 3 includes at least a registered tire ID code, history data corresponding to that registered tire ID code and the initial registration date for the registered tire ID code.

The receiver 4 has a reception switch 29 for permitting reception of the transmission request signal from the external communication apparatus 5. Only when this reception switch 29 is turned on by a worker can the second reception circuit 27 receive the transmission request signal from the external communication apparatus 5.

Figure 4:
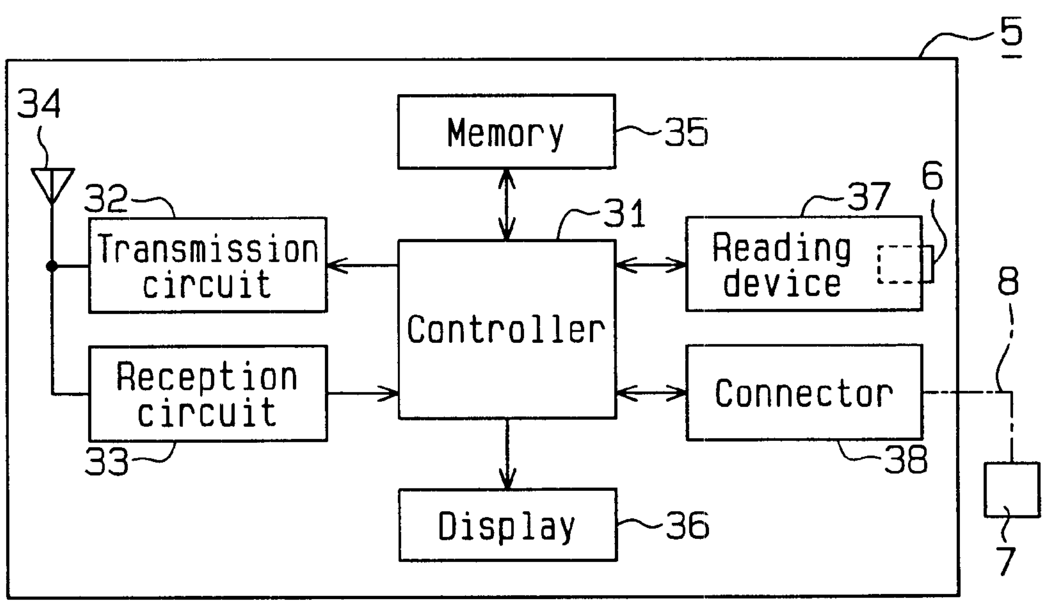
FIG. 4 is a block circuit diagram illustrating an external communication apparatus that performs radio communication with the receiver in FIG. 3.

The external communication apparatus 5 shown in FIG. 4 is provided to communicate with the receiver 4. It is preferred that the external communication apparatus 5 be portable. It is also preferred that the external communication apparatus 5 be placed at a predetermined location where the vehicle 1 is stopped, such as a parking place or a gas station. When the vehicle 1 is one a fleet of vehicles such as taxis, trucks or buses, the external communication apparatus 5 is preferably located at a fleet station or parking area. The external communication apparatus 5 can be easily carried around by an operator.

The external communication apparatus 5 has a controller 31, which includes a microcomputer or the like. The controller 31 includes, for example, a CPU, an RAM and an ROM.

A transmission circuit 32, or transmission device, radio-transmits the transmission request signal to the receiver 4 via an antenna 34. A reception circuit 33, or reception device, receives radio-transmitted data from the receiver 4 and sends the data to the controller 31. The controller 31 stores the received data in a memory 35.

The controller 31 also displays the data stored in the memory 35 on a display 36. The external communication apparatus 5 may be provided with a display switch (not shown). When this display switch is operated, the data stored in the memory 35 is displayed on the display 36.

The external communication apparatus 5 has a reading device 37 for reading data recorded on a predetermined recording medium, preferably a magnetic card 6. Identification information for identifying the tire air pressure monitoring apparatus (vehicle ID) has previously been recorded on the magnetic card 6. The vehicle ID information is, for example, information identifying the particular tire air pressure monitoring apparatus (i.e., information indicating the specific receiver 4) or information specifying the vehicle 1 in which the tire air pressure monitoring apparatus is installed or the driver who mainly uses the vehicle 1.

When the magnetic card 6 is loaded into the reading device 37, the controller 31 commands the reading device 37 to read the vehicle ID information from the magnetic card 6 and stores the vehicle ID information in the memory 35. Subsequently, the controller 31 sends the transmission request signal via the transmission circuit 32 to the receiver 4 that corresponds to the vehicle ID information. In response to this transmission request signal, the data sent from the receiver 4 is stored in the memory 35 in association with the vehicle ID information corresponding to that receiver 4.

The external communication apparatus 5 has a connector 38 to connect to a predetermined information processing apparatus 7, such as a personal computer, via a cable 8. With the information processing apparatus 7 connected to the connector 38 via the cable 8, data stored in the memory 35 is transferred to the information processing apparatus 7.

The operation and advantages of the tire air pressure monitoring apparatus and external communication apparatus 5 having the above-described structures will now be discussed.

The four transmitters 3 installed on the vehicle 1 measure the internal air pressures and internal temperatures of the associated tires 2 at predetermined time intervals and radio-transmit the measured data and their tire ID codes to the receiver 4. The receiver 4 displays the received data from the transmitters 3 on the display 23 and stores the data as history data in the non-volatile memory 25. The non-volatile memory 25 stores history data in association with the corresponding tire ID code. In other words, the non-volatile memory 25 stores history data in association with the respective tire ID code initially registered in the non-volatile memory 25.

When the vehicle 1 is stationary at a predetermined location, first, the magnetic card 6 that has vehicle ID information corresponding to that vehicle 1 recorded thereon is loaded into the reading device 37 of the external communication apparatus 5. Then, the vehicle ID information is read from the magnetic card 6 by the reading device 37 and is stored in the memory 35 in the external communication apparatus 5.

Then, the external communication apparatus 5 radio-transmits a transmission request signal to the receiver 4 corresponding to the vehicle ID information. The reception switch 29 is switched on prior to radio transmission of the transmission request signal. Accordingly, the receiver 4 receives the transmission request signal from the external communication apparatus 5 and radio-transmits the data stored in the non-volatile memory 25 to the external communication apparatus 5 in response to the request signal.

The external communication apparatus 5 stores the data from the receiver 4 in the memory 35 in association with the vehicle ID information. The data in this memory 35 is displayed on the display 36 as needed.

When the information processing apparatus 7, such as a personal computer, is connected to the connector 38 of the external communication apparatus 5, the data stored in the memory 35 is transferred to the information processing apparatus 7.

According to this embodiment, as elaborated above, the data stored in the non-volatile memory 25 of the receiver 4 is radio-transmitted in response to a request from the external communication apparatus 5. This allows various kinds of data such as air pressure data to be easily loaded into the external communication apparatus 5 without connecting a cable to the receiver 4. The data transferred to the external communication apparatus 5 is used for maintenance and management of the vehicle 1.

The data transferred to the external communication apparatus 5 from the receiver 4 can be displayed on the display 36 of the external communication apparatus 5. Even if the operator of the vehicle 1 does not see information on the display 23 of the receiver 4 while driving the vehicle 1, therefore, the operator can easily and reliably determine the status, such as the air pressures of the tires, outside the vehicle 1 through the display 36 of the external communication apparatus 5 after driving the vehicle 1.

The data sent to the external communication apparatus 5 from the receiver 4 includes the initial registration date of the tire ID codes registered in the receiver 4. In general, when tires 2 are installed on the vehicle 1 for the first time, the identification codes of the transmitters 3 provided in those tires 2 are initially registered in the memory of the receiver. Thus, the initial registration date of the tire ID codes represents the date that the tires 2 were installed on the vehicle 1 or the date the tires 2 were changed. Therefore, the date of installation of the tires 2 on the vehicle 1 can also be determined based on the initial registration date of the tire ID codes loaded into the external communication apparatus 5. The tire installation for maintenance and management of the tires 2, e.g., information that suggests the time for tire replacement.

Transferring the data stored in the memory 35 of the external communication apparatus 5 to the information processing apparatus 7 that is connected to the connector 38 allows the information processing apparatus 7 to easily perform collective fleet management.

The external communication apparatus 5 stores the vehicle ID information read from the magnetic card 6 in association with the data from the receiver 4 corresponding to that ID information. This readily fixes the association between the data loaded into the external communication apparatus 5 and the vehicle 1. This feature is particularly useful in collectively managing data for a fleet of vehicles 1.

Only when the reception switch 29 is set on can the receiver 4 receive the transmission request signal from the external communication apparatus 5. Even when a plurality of vehicles 1 are stopped in close proximity, therefore, it is possible to acquire data from the receiver 4 of the desired vehicle 1.

This invention is not limited to the above-described embodiment, but may be modified in the following forms. The first reception circuit 21 may be designed to perform the function of the second reception circuit 27, and the second reception circuit 27 can be eliminated. In this case, the first reception circuit 21 should receive and demodulate not only the modulated signal from each transmitter 3 but also the modulated signal from the external communication apparatus 5, which differs from the former modulated signal. For example, the first reception circuit 21 can demodulate the signal from each transmitter 3 when the reception switch 29 is off and demodulate the signal from the external communication apparatus 5 when the reception switch 29 is on.

A specific vehicle ID code may be stored in advance in the controller 20 or the non-volatile memory 25 of the receiver 4 so that this vehicle ID code is used as ID information to be recorded on the magnetic card 6. In this case, the external communication apparatus 5 not only stores the ID code read from the magnetic card 6 into the memory 35, but also affixes it to the transmission request signal and radio-transmits the resultant signal. Upon reception of the transmission request signal, the receiver 4 transmits data to the external communication apparatus 5 only when the ID code in the transmission request signal matches with its own ID code. With this modification, the reception switch 29 can be eliminated from the receiver 4. This modification can also simplify radio communication between the external communication apparatus 5 and the desired receiver 4.

The external communication apparatus 5 may be constructed to perform radio communication with the information processing apparatus 7 via the transmission circuit 32 and the reception circuit 33. This can permit data transfer to the information processing apparatus 7 from the external communication apparatus 5 by radio, instead of a cable, thereby eliminating the need for the connector 38 of the external communication apparatus 5.

If there is but one vehicle 1 from which data should be transferred to the external communication apparatus 5, the reading device 37 can be eliminated from the external communication apparatus 5.

The non-volatile memory 25 of the receiver 4 at least should store the initial registration date of the tire ID codes, and need not be the initial registration time thereof.

The present examples and embodiments are to be considered as illustrative and not restrictive and the invention is not to be limited to the details given herein, but may be modified within the scope and equivalence of the appended claims.

What is claimed is:

1. A tire air pressure monitoring apparatus mounted on a vehicle for monitoring the air pressure of a tire on the vehicle, the monitoring apparatus comprising:

a pressure sensor capable of producing an output, located in the tire for measuring the air pressure of the tire;

a transmitter located in the tire operably coupled to the pressure sensor for transmitting data related to the output of the pressure sensor;

a receiver, including a first reception device and a second reception device, located outside the tire capable of receiving data transmitted by the transmitter;

wherein the first reception device receives data wirelessly transmitted from the transmitter, and the second reception device receives a wirelessly transmitted external request signal;

a memory operably coupled to the receiver and located outside the tire for storing data related to the output of the pressure sensor as received by the receiver and vehicle identification information;

a notification unit located outside the tire for notifying an operator of an abnormality in the measured air pressure; and a transmission device located outside the tire for wirelessly transmitting data stored in the memory;

wherein the transmission device transmits data stored in the memory in association with the vehicle identification information in response to reception of the wirelessly transmitted external request signal.

2. The monitoring apparatus according to claim 1, wherein the transmitter transmits unique identification information, wherein the receiver has a timer circuit, and the unique identification information is initially registered in the memory of the receiver in association with at least a date indicated by the timer circuit.

3. The monitoring apparatus according to claim 1, wherein the first reception device serves as the second reception device.

4. The monitoring apparatus according to claim 1, wherein the receiver has a reception switch that is operated to permit reception of the external request signal.

5. A tire air pressure monitoring apparatus having a transmitter provided in a tire on a vehicle and a receiver mounted on a body frame of the vehicle, the monitoring apparatus comprising:

a pressure sensor, provided in the transmitter, for measuring the air pressure of the tire whereby the transmitter wirelessly transmits data including data representing the measured air pressure;

a first reception device, provided in the receiver, for receiving data wirelessly transmitted from the transmitter;

a memory, provided in the receiver, for storing the received data;

a notification unit, connected to the receiver, for notifying an operator of an abnormality in the measured air pressure;

a second reception device, provided in the receiver, for receiving a wireless request signal;

a transmission device, provided in the receiver, for wirelessly transmitting data stored in the memory in response to reception of the request signal; and a reception switch, provided in the receiver, for permitting reception of the request signal, wherein reception of the request signal is permitted only when the reception switch is operated.

6. A tire air pressure monitoring apparatus that monitors the air pressure of a tire on a vehicle, the monitoring apparatus comprising:

a transmitter, which is provided in the tire, for measuring the air pressure of the tire and for wirelessly transmitting data representing the measured air pressure;

a receiver, which is mounted on a vehicle body frame, for receiving data, wherein the receiver includes:

a receiving device for receiving data;

a first memory for storing the received data;

a notification unit for notifying an operator of an abnormality in the measured air pressure; and a first transmission device for wirelessly transmitting data stored in the first memory;

vehicle identification information;

an external communication apparatus located separately from the vehicle, wherein the external communication apparatus includes:

a second transmission device for wirelessly transmitting a signal requesting transmission of data, representing the tire air pressure of the tire, to the receiver;

a reception device for receiving data wirelessly transmitted from the first transmission device; and a second memory for storing the data received by the reception device;

wherein the receiving device of the receiver receives data transmitted by the transmitter as well as from the second transmission device of the external communication apparatus, and wherein the vehicle identification information may be used to associate the data transmitted from the first transmission device with the vehicle in the data received in second memory.

7. The tire pressure monitoring apparatus according to claim 6, wherein the external communication apparatus further includes a display for displaying the data stored in the second memory.

8. The tire pressure monitoring apparatus according to claim 6, wherein the external communication apparatus further includes a connector for connecting the external communication apparatus to a predetermined information processing apparatus to transfer the data stored in the second memory to the information processing apparatus.

9. The tire pressure monitoring apparatus according to claim 6, wherein identification information associated with the tire air pressure monitoring apparatus is recorded on a predetermined recording medium, the external communication apparatus further comprising a reading device for reading the identification information from the recording medium, and the second memory stores the read identification information in association with data from the tire air pressure monitoring apparatus that corresponds to that identification information.

10. The tire pressure monitoring apparatus according to claim 8, wherein the identification information is affixed to the signal requesting transmission of data and the second transmission device transmits the resultant signal to the receiver, and the first transmission device transmits data to the reception device of the external communication apparatus only when the identification information in the signal requesting transmission of data matches with identification information of the receiver.

* * * * *

UNITED STATES PATENT AND TRADEMARK OFFICE

CERTIFICATE OF CORRECTION

PATENT NO. : 6,505,507 B1 Page 1 of 1
DATED : January 14, 2003
INVENTOR(S) : Noboru Imao et al.

It is certified that error appears in the above-identified patent and that said Letters Patent is hereby corrected as shown below:

Column 10,
Line 12, delete “claim 8” and insert therefor -- claim 6 --.

Signed and Sealed this

Twenty-fourth Day of June, 2003

JAMES E. ROGAN
*Director of the United States Patent and Trademark Office*